United States Patent
Hada et al.

(10) Patent No.: US 11,460,824 B2
(45) Date of Patent: Oct. 4, 2022

(54) NUMERICAL CONTROLLER

(71) Applicant: Fanuc Corporation, Yamanashi (JP)

(72) Inventors: Hiroaki Hada, Yamanashi (JP); Osamu Hanaoka, Yamanashi (JP); Jost Kurzrock, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 205 days.

(21) Appl. No.: 16/667,251

(22) Filed: Oct. 29, 2019

(65) Prior Publication Data

US 2020/0133225 A1    Apr. 30, 2020

(30) Foreign Application Priority Data

Oct. 31, 2018  (JP) .............................. JP2018-206003

(51) Int. Cl.
*G05B 19/19* (2006.01)

(52) U.S. Cl.
CPC .... *G05B 19/19* (2013.01); *G05B 2219/31472* (2013.01); *G05B 2219/40091* (2013.01)

(58) Field of Classification Search
CPC .......... G05B 19/19; G05B 2219/40091; G05B 2219/31472; G05B 2219/35303; G05B 2219/36071; G05B 2219/36252; G05B 19/4069; G05B 19/4142; G05B 2219/34013

See application file for complete search history.

(56) References Cited

U.S. PATENT DOCUMENTS

| | | | |
|---|---|---|---|
| 2012/0296462 A1 | 11/2012 | Otsuki et al. | |
| 2013/0054182 A1* | 2/2013 | Tezuka | G05B 19/408 |
| | | | 702/141 |
| 2017/0082999 A1* | 3/2017 | Walter, III | G05B 19/27 |
| 2017/0308057 A1* | 10/2017 | Kreidler | G05B 19/41875 |
| 2018/0136628 A1* | 5/2018 | Tezuka | G05B 19/402 |
| 2019/0212720 A1* | 7/2019 | Eriksson | G05B 23/0221 |
| 2019/0391561 A1* | 12/2019 | Anderson | G05B 19/4097 |

FOREIGN PATENT DOCUMENTS

| | | |
|---|---|---|
| EP | 0510204 A1 | 10/1992 |
| JP | 4177408 A | 6/1992 |
| JP | 11143514 A | 5/1999 |
| JP | 2001125613 A | 5/2001 |
| JP | 2012-243152 A | 12/2012 |

OTHER PUBLICATIONS

Japanese Notice of Reasons for Refusal for Japanese Application No. 2018-206003, dated Dec. 8, 2020, with translation, 8 pages.

* cited by examiner

*Primary Examiner* — Charles R Kasenge
(74) *Attorney, Agent, or Firm* — RatnerPrestia (57) ABSTRACT

A numerical controller is provided with a control unit configured to control a machine tool and acquire feedback data in relative positions of a tool and a workpiece, a machining simulation unit configured to perform simulation processing for machining based on a machining program and create the shape of the machined workpiece, and a display unit configured to display the machined workpiece shape created by the machining simulation unit. The machining simulation unit performs machining simulation processing using the feedback data acquired by the control unit, in place of relative movement paths for the tool and the workpiece based on a command by the machining program.

6 Claims, 5 Drawing Sheets

NUMERICAL CONTROLLER

RELATED APPLICATION

The present application claims priority to Japanese Application Number 2018-206003 filed Oct. 31, 2018, the disclosure of which is hereby incorporated by reference herein in its entirety.

BACKGROUND OF THE INVENTION

Field of the Invention

The present invention relates to a numerical controller, and more particularly, to a numerical controller configured to perform optimal axis setting based on feedback data.

Description of the Related Art

In a numerical controller, simulation of machining is performed based on calculation of relative paths for a tool and a workpiece from a machining program, whereby the machining state and machining shape are ascertained, and interference of the tool with a jig, a table, the workpiece, and the like is checked, for example. However, even if it is confirmed that the machining shape and the interference involve no problem after the machining simulation is performed for a certain machining program, the surface quality of a machined surface may sometimes be influenced because a machine tool is caused to vibrate by acceleration and jerk of a drive axis when the machining program is executed to actually machine the workpiece.

In conventional machining simulation, on the other hand, relative paths of the tool and the workpiece are calculated based on the machining program. Although the acceleration of each axis is taken into consideration in this conventional machining simulation, this is done only to calculate the machining time, and it is difficult also to simulate vibration by acceleration and jerk (e.g., Japanese Patent Application Laid-Open No. 2012-243152). In other words, no consideration is given to the influence of mechanical vibration on the machined surface quality in the conventional machining simulation, and it is hard to previously ascertain this situation by the machining simulation. Thus, if high-quality machining that is susceptible to mechanical vibration is required, for example, the surface quality cannot be identified unless the workpiece is actually machined.

According to an alternative technique for ascertaining vibration generated during machining, machining simulation based on the consideration of the influence of mechanical vibration can be implemented by driving (or idling) an axis of a machine tool with no workpiece to be machined set and acquiring relative positions (feedback data) of an actual tool and a workpiece from a servo mechanism.

Figure 8:
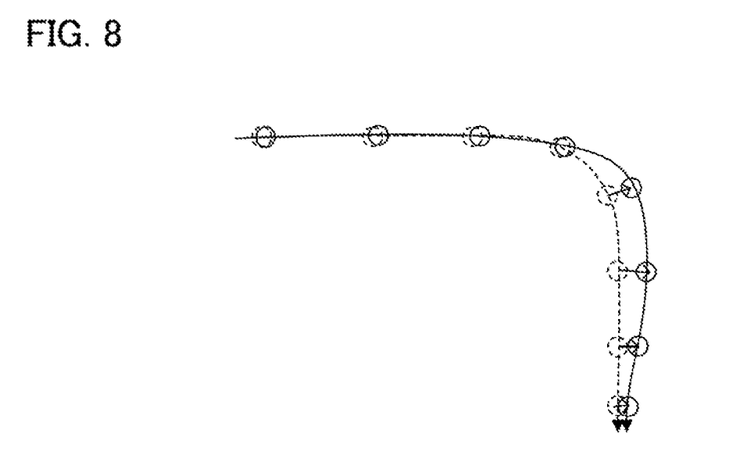
FIG. 8 is a prior art display example of machining paths based on machining simulation in consideration of mechanical vibration.

FIG. 8 is a display example of machining paths based on the machining simulation in consideration of mechanical vibration using feedback data acquired by idling. In this drawing, circles and a curve indicated by broken lines represent a machining path commanded by the machining program. On the other hand, circles and a curve indicated by full lines represent a machining path based on the consideration of mechanical vibration using the feedback data acquired in an idling state. In FIG. 8, arrows drawn between the broken- and full-line circles represent path errors between the machining path commanded by the machining program and the machining path based on the consideration of mechanical vibration. By using the above technique in this manner, the machining paths in actual workpiece machining can be ascertained and the influence of mechanical vibration or the like on the machined surface quality can be identified.

However, there remains a problem that the above technique is a function capable of only identifying the influence of mechanical vibration or the like on the machined surface quality and cannot be a measure to ascertain the means for improving the workpiece surface quality.

SUMMARY OF THE INVENTION

Accordingly, the object of the present invention is to provide a numerical controller enabling a worker to ascertain optimal axis setting based on feedback data.

The present invention solves the above problems by providing a numerical controller with a function of displaying the result of machining simulation based on feedback data acquired during idling for driving an axis of a machine tool with no workpiece set.

Moreover, the numerical controller of the present invention is configured to be able to quantitatively ascertain the vibration of the axis by obtaining the feedback data acquired during idling for driving the axis of the machine tool with no workpiece set and command data by a machining program or differences (path errors) between the feedback data and CAD data so that the machining position in which the vibration is generated can be visually identified by reflecting the obtained path errors in the machining simulation result.

Furthermore, a more detailed surface quality can be identified by performing high-precision graphic display by machining simulation for only those parts with large path errors. It can be determined whether the vibration does not influence machining by displaying the path errors divided into coordinate-direction components (x, y, z) or into components in the relative movement directions of the tool and the workpiece in the individual machining positions and components perpendicular to the relative movement directions of the tool and the workpiece.

One aspect of the present invention is a numerical controller configured to relatively control a tool of a machine tool and a workpiece based on a machining program, thereby machining the workpiece, and comprises a control unit configured to control the machine tool and acquire feedback data in relative positions of the tool and the workpiece, a machining simulation unit configured to perform simulation processing for the machining based on the machining program and create the shape of the machined workpiece, and a display unit configured to display the machined workpiece shape created by the machining simulation unit. The machining simulation unit performs machining simulation processing using the feedback data acquired by the control unit, in place of the relative movement paths for the tool and the workpiece based on a command by the machining program.

According to the present invention, a simulation result closely resembling the actual machining result can be ascertained by performing the machining simulation processing based on actual axis operation data. Accordingly, there is no need of trial-and-error learning, and in addition, there is no need of actual machining, so that unnecessary tool wear can be reduced. Moreover, a worker can ascertain the influence of vibration on a machined surface by reflecting path errors in the simulation result.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Embodiments of the present invention will now be described with reference to the accompanying drawings.

Figure 1:
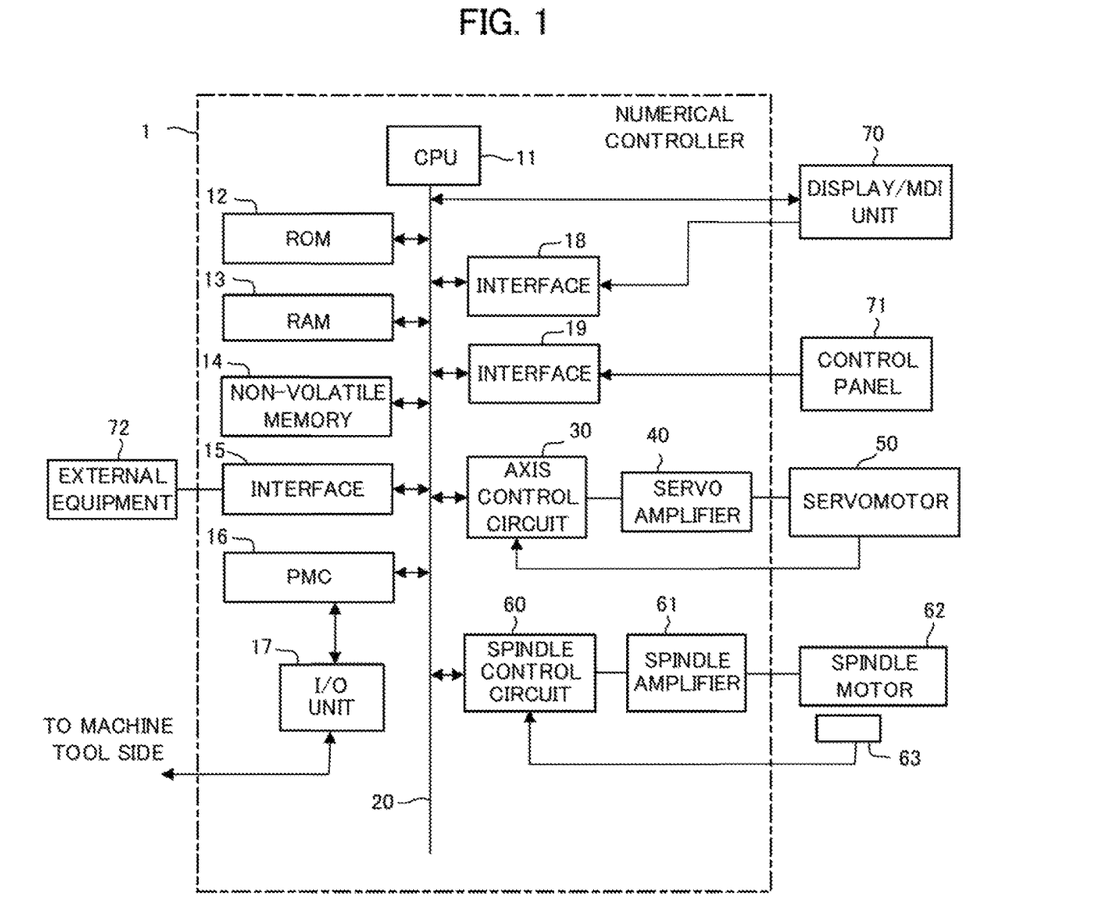
FIG. 1 is a schematic hardware configuration diagram of a numerical controller according to an embodiment.

FIG. 1 is a schematic hardware configuration diagram showing principal parts of a numerical controller 1 according to an embodiment of the present invention.

A CPU 11 of the numerical controller 1 according to the present embodiment is a processor for generally controlling the numerical controller 1. The CPU 11 reads out a system program stored in a ROM 12 via a bus 20 and controls the entire numerical controller 1 according to this system program. A RAM 13 is temporarily loaded with temporary calculation data and display data, various externally input data, and the like.

A non-volatile memory 14 is composed of, for example, a memory, SSD (solid state drive), or the like backed up by a battery (not shown) so that its storage state can be maintained even when the numerical controller 1 is switched off. The non-volatile memory 14 is stored with machining programs and CAD data read from external equipment 72 through an interface 15, a machining program input through a display/MDI unit 70, various data acquired from various parts of the numerical controller 1, a machine tool, sensors, and the like. The machining programs and the various data stored in the non-volatile memory 14 may be developed in the RAM 13 during execution and use. Moreover, various system programs, such as a conventional analysis program and a simulation program, are previously written in the ROM 12.

The interface 15 is an interface for connecting the numerical controller 1 and the external equipment 72 including a USB device. A control program, various parameters, and the like are read from the side of the external equipment 72. Moreover, the control program, various parameters, and the like edited in the numerical controller 1 can be stored into an external storage means through the external equipment 72. A PMC (programmable machine controller) 16 controls the machine tool and its peripheral devices (e.g., actuators such as a tool changer and a robot, sensors attached to the machine tool, etc.) by outputting signals to them through the I/O unit 17 according to a sequence program built in the numerical controller 1. Furthermore, when signals are received from various switches on a control panel on the main body of the machine tool and the peripheral devices, they are subjected to necessary signal processing and then delivered to the CPU 11.

The display/MDI unit 70 is a manual data input device equipped with a display, keyboard, and the like, and an interface 18 receives commands and data from the keyboard of the display/MDI unit 70 and delivers them to the CPU 11. Moreover, data on display performances, such as the resolution, actual size, and the like of a display screen, can be acquired from the display/MDI unit 70. An interface 19 is connected to a control panel 71 equipped with a manual pulse generator or the like used to manually drive individual axes.

An axis control circuit 30 for controlling the axes of the machine tool receives a movement command amount for each axis from the CPU 11 and outputs a command for the axis to a servo amplifier 40. On receiving the command, the servo amplifier 40 drives a servomotor 50 for moving the axes of the machine tool. The axis servomotor 50 has a position/speed detector built-in. Position/speed feedback control is performed by feeding back a position/speed feedback signal from this position/speed detector to the axis control circuit 30. In the hardware configuration diagram of FIG. 1, the axis control circuit 30, servo amplifier 40, and servomotor 50 are each shown as being only one in number. Actually, however, these elements are provided corresponding in number to the axes of the machine tool.

On receiving a spindle rotation command, a spindle control circuit 60 outputs a spindle speed signal to a spindle amplifier 61. On receiving this spindle speed signal, the spindle amplifier 61 rotates a spindle motor 62 of the machine tool at a commanded rotational speed, thereby driving a tool. The spindle motor 62 is connected with a position coder 63. The position coder 63 outputs feedback pulses in synchronism with the rotation of the spindle, and the feedback pulses are read by the CPU 11.

Figure 2:
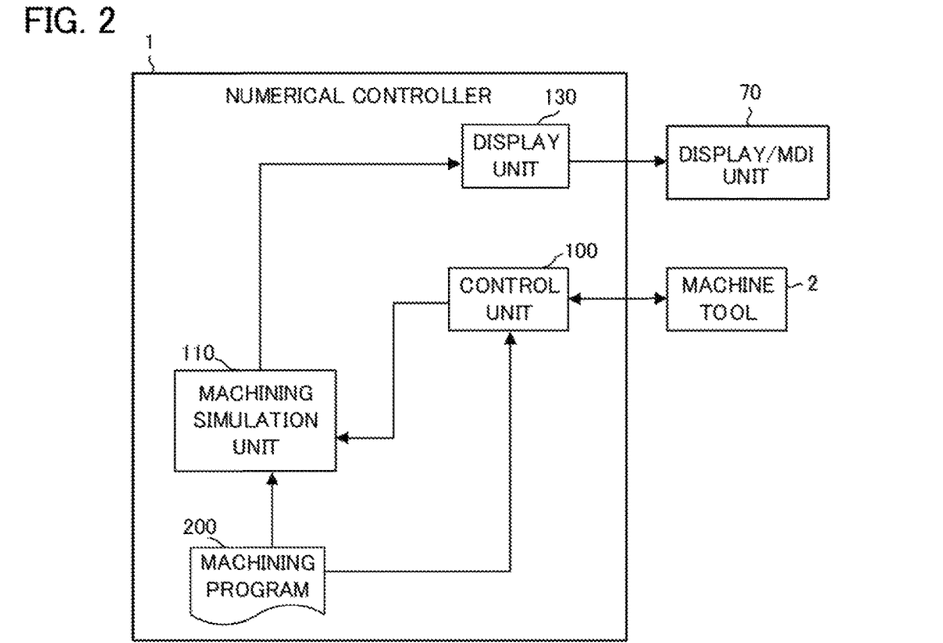
FIG. 2 is a schematic functional block diagram of a numerical controller according to a first embodiment.

FIG. 2 is a schematic functional block diagram of a numerical controller 1 according to a first embodiment of the present invention. Each functional block shown in FIG. 2 is implemented as the CPU 11 of the numerical controller 1 shown in FIG. 1 executes the system program and controls the operation of each part of the numerical controller 1.

The numerical controller 1 of the present embodiment comprises a control unit 100, machining simulation unit 110, and display unit 130, and a machining program 200 as an object of machining simulation is previously stored on the non-volatile memory 14.

The control unit 100 is a functional means for controlling various parts of a machine tool 2 (driven by the servomotor 50 and the spindle motor 62 of FIG. 1) based on a worker's control operation of a control panel (not shown) or a command acquired from the machining program 200 or the like stored in the non-volatile memory 14 or the like. The control unit 100 performs control to output command data as a variation of the angle of each axis of the machine tool 2, for each control period, to the servomotor 50 for driving the axis if the command acquired from the machining program 200 urges each axis to move, for example. Thus, the control unit 100 has a function for general control required to control the individual parts of the machine tool 2. Moreover, the control unit 100 acquires feedback data (motor current value, motor position, speed, and acceleration, motor torque, etc.) of each motor for driving the machine tool 2 and outputs the acquired motor feedback data to the machining simulation unit 110.

The machining simulation unit 110 simulates a machining operation by the machine tool 2, based on the command acquired from the machining program 200 stored in the non-volatile memory 14 or the like and the motor feedback data input from the control unit 100. Consequently, the machining simulation unit 110 creates and outputs data as the result of general machining simulation processing, such as relative movement paths for the tool and a workpiece during machining, load on the tool, cycle time during the machining, machined workpiece shape, and the like. In the prior art machining simulation processing, the relative movement paths for the tool and the workpiece are created based on the command acquired from the machining program 200, and the machined workpiece shape as a simulation result is created based on the created movement paths (and tool shape, etc.). In contrast, the machining simulation unit 110 according to the present embodiment further uses the feedback data input from the control unit 100, in place of the relative movement paths for the tool and the workpiece created based on the command acquired from the machining program 200 in the machining simulation processing. The machining simulation unit 110 may further use preset specifications of the machine tool, data on the workpiece, and the like. Moreover, the machining simulation unit 110 may perform machining simulation based on the CAD data in place of the machining program 200. Also in this case, the machined workpiece shape is created based on the feedback data. A generally known machining simulation method may be suitably used for other processing steps or functions in the machining simulation processing performed by the machining simulation unit 110.

The display unit 130 is a functional means for displaying data on the result of the machining simulation processing by the machining simulation unit 110 on the display/MDI unit 70 by three-dimensional display or the like. The display unit 130 displays on the display/MDI unit 70 the machined workpiece shape as a result obtained as the machining simulation unit 110 performs the machining simulation processing by using the feedback data, for example. Depending on the worker's operation of the display/MDI unit 70, the display unit 130 may perform, for example, enlarged display of the details the machined workpiece shape.

Figure 3:
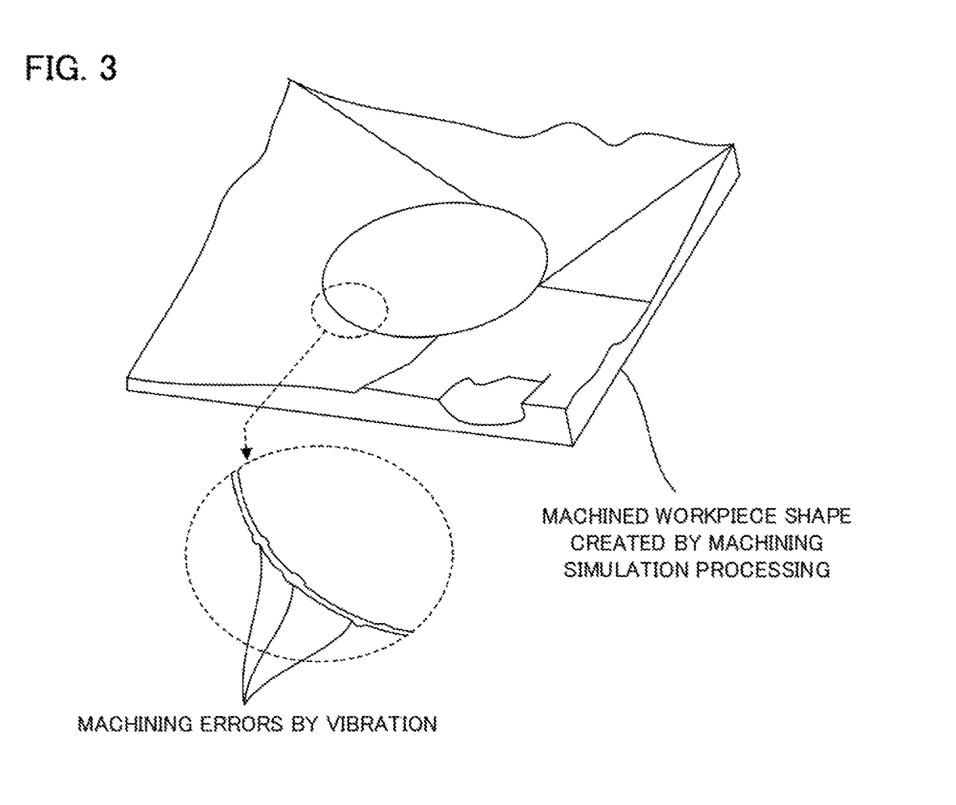
FIG. 3 is a view showing an example of machining simulation result display.

FIG. 3 is a view schematically showing the machined workpiece shape created as the result of execution of the machining simulation processing by the machining simulation unit 110 based on the feedback data. The upper view of FIG. 3 shows the whole of the machined workpiece shape created by the machining simulation unit 110, while the lower view of FIG. 3 shows an enlarged part of the workpiece shape. The machining simulation unit 110 according to the present embodiment uses the feedback data from the motor to create the machined workpiece shape. The actual relative movement paths for the tool and the workpiece for the case where the machining program 200 is executed according to the machining program 200 is reflected in the machined workpiece shape created in that manner. Therefore, machining errors caused in those parts in which vibration or the like is generated due to excessively high acceleration or jerk during relative movements of the tool and the workpiece, for example, are reflected in the machined workpiece shape created by the machining simulation unit 110 in the machining simulation processing.

The numerical controller 1 of the present embodiment constructed in this manner can achieve machining simulation closely resembling the actual machining result by performing the machining simulation processing based on feedback data as actual axis operation data. Moreover, the machining errors caused by high acceleration, jerk, or the like are reflected in the machined workpiece shape created as the result of the machining simulation. Therefore, the worker having viewed the display of the machined workpiece shape can check the positions of occurrence of the machining errors and adjust parameters related to axis movements at the parts concerned. In particular, the machining simulation processing in recent years enables creation of a precise machined workpiece shape. The worker can check on the screen those machining errors generated by horizontal vibration relative to the direction of the relative movements of the tool and the workpiece and by depth-direction vibration. Thus, the worker can ascertain the axis whose parameters should be adjusted depending on the movement direction by only glancing at the result of machining simulation processing.

Figure 4:
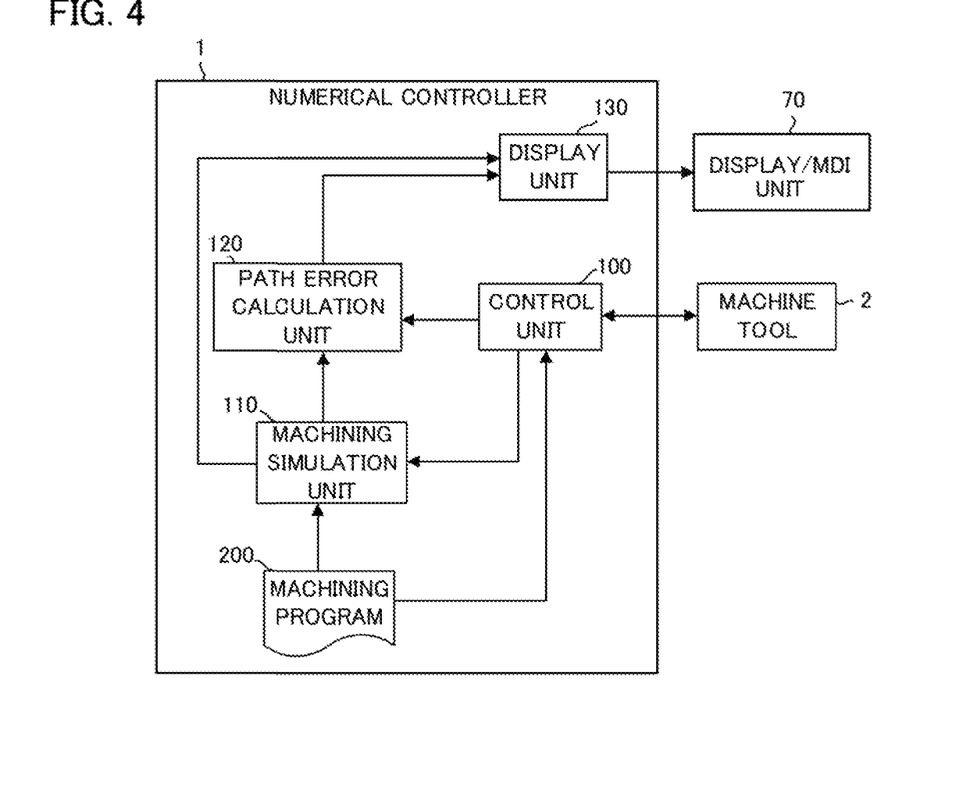
FIG. 4 is a schematic functional block diagram of a numerical controller according to a second embodiment.

FIG. 4 is a schematic functional block diagram of a numerical controller 1 according to a second embodiment of the present invention. Each functional block shown in FIG. 4 is implemented as the CPU 11 of the numerical controller 1 shown in FIG. 1 executes the system program and controls the operation of each part of the numerical controller 1.

The numerical controller 1 of the present embodiment comprises a control unit 100, machining simulation unit 110, path error calculation unit 120, and display unit 130, and a machining program 200 as an object of machining simulation is previously stored on the non-volatile memory 14.

The control unit 100 according to the present embodiment has the same function as that of the first embodiment, and moreover, outputs feedback data (motor current value, motor position, speed, and acceleration, motor torque, etc.) of each motor for driving the machine tool 2 to the path error calculation unit 120.

Furthermore, the machining simulation unit 110 according to the present embodiment has the same function as that of the first embodiment, and moreover, creates relative movement paths for a tool and a workpiece during machining by the machine tool 2, based on a command acquired from the machining program 200, and outputs the created relative movement paths for the tool and the workpiece to the path error calculation unit 120.

Based on the feedback data of each motor for driving the machine tool 2 input from the control unit 100 and the relative movement paths for the tool and the workpiece during the machining acquired from the machining simulation unit 110, the path error calculation unit 120 calculates path errors as differences between the feedback data and the relative movement paths for the tool and the workpiece based on the command. The path error calculation unit 120 is aware of the correspondence of positions in units of interpolation cycles between the feedback data of each motor for driving the machine tool 2 input from the control unit 100 and the relative movement paths for the tool and the workpiece created by the machining simulation unit 110. To attain this, the path error calculation unit 120 may ascertain the correspondence between the feedback data and the relative movement paths in units of interpolation cycles in the control of the servomotor 50 acquired from the control unit 100. Alternatively, the path error calculation unit 120 may ascertain the correspondence by associating the relative positions of the tool and the workpiece for each interpolation cycle after the execution of the command of the control unit 100 with the relative positions of the tool and the workpiece for each interpolation cycle obtained on the simulation by the machining simulation unit 110. In the case of the latter method, it is necessary only that the delay time of the feedback data be measured in advance by experiment or the like so that the correspondence between the individual points can be achieved in consideration of the delay time.

Figure 5:
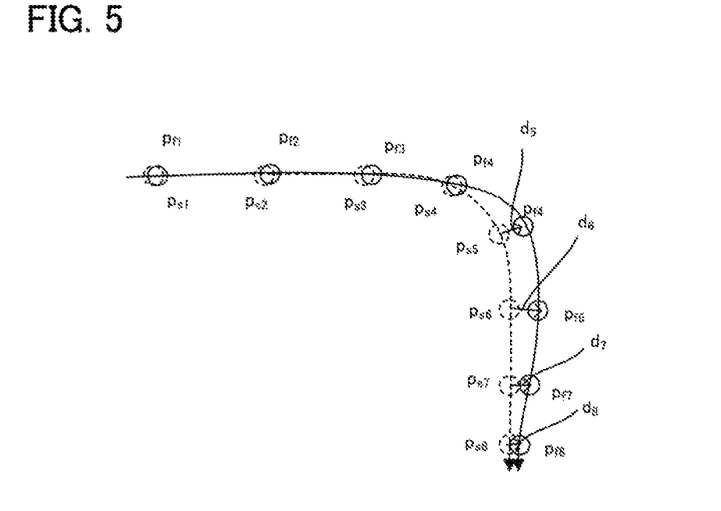
FIG. 5 is a diagram illustrating a method for calculating path errors.

As illustrated in FIG. 5, for example, if relative positions $p_{ri}$ of the tool and the workpiece indicated by the feedback data and relative positions $p_{si}$ of the tool and the workpiece obtained on the simulation by the machining simulation unit 110 correspond to one another, at individual points in time during elapsed times ti (i=0, 1, 2, . . . ) for each interpolation cycle after the execution of the command by the control unit 100, the path error calculation unit 120 calculates the differences between the corresponding positions $p_{ri}$ and $p_{si}$ as path errors $d_i$.

Figure 6:
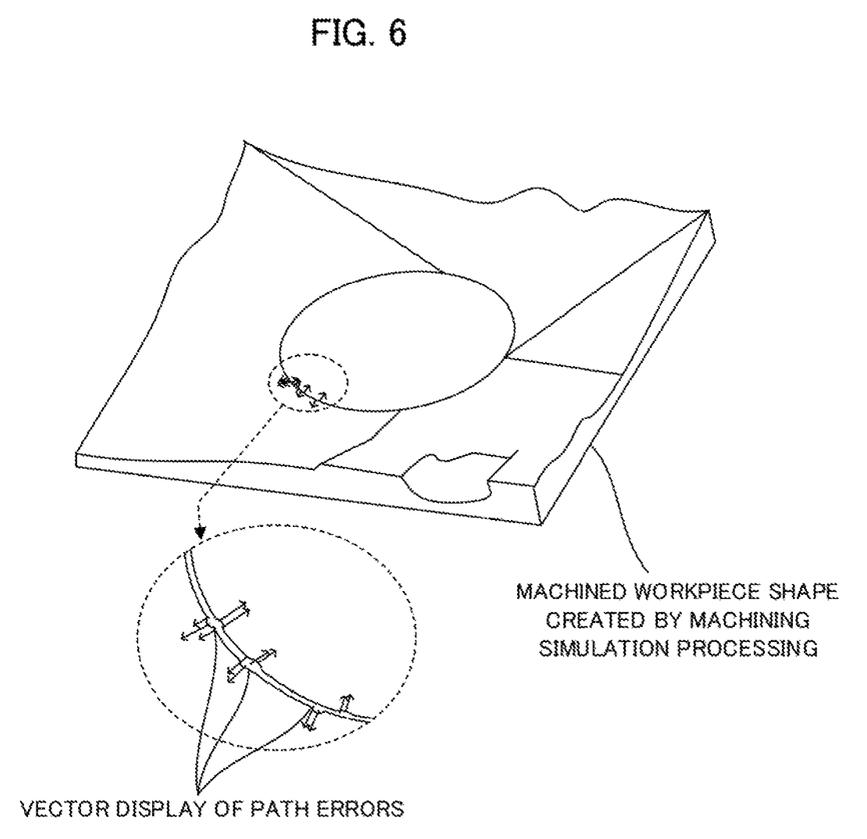
FIG. 6 is a view showing another example of the machining simulation result display.

The display unit 130 is a functional means for displaying information on the path errors superimposed on the display of the machined workpiece shape, as the result of the machining simulation by the machining simulation unit 110, on the display/MDI unit 70, based on data on the result of the simulation processing by the machining simulation unit 110 and the path errors $d_i$ in the individual machining positions calculated by the path error calculation unit 120. As illustrated in FIG. 6, for example, the display unit 130 may be configured to superimpose-display the path errors $d_i$ in the individual machining positions, in a vector format or the like, on the display of the machined surface of the workpiece as a simulation result obtained as the machining simulation unit 110 performs the machining simulation processing.

The display of the information on the path errors by the display unit 130 can adopt various display formats, and the path errors $d_i$ may be designed to be displayed for only those parts in which a preset predetermined threshold value $th_d$ is exceeded. The display unit 130 may be configured to divide the path errors $d_i$ into coordinate-direction components, X-, Y-, and Z-axes, as it displays them. Alternatively, the display unit 130 may be configured to divide the path errors $d_i$ into components in the relative movement directions of the tool and the workpiece in the individual machining positions, components (indicative of vertical deviations from the movement directions) perpendicular to the machined surface in the machining positions, and components (indicative of horizontal deviations from the movement directions) in the movement directions and in the directions perpendicular to the machined surface in the machining positions, as it display the path errors $d_i$. In this case, moreover, the display unit 130 may be configured to previously provide threshold values individually for the components for the calculated path errors $d_i$ so that it can display only those components found to exceed the threshold values by comparison between the threshold values and the individual components of the path errors $d_i$. Furthermore, the display unit 130 may be configured to adopt various display formats such that the color or shape, for example, is changed for each of the components in the individual directions of the path errors $d_i$.

The numerical controller 1 of the present embodiment constructed in this manner displays path errors between the relative movement paths for the tool and the workpiece commanded by the machining program 200 and relative movement paths for the tool and the workpiece closely resembling actual machining together with the machined workpiece shape. The worker having viewed this display can more securely check the positions of occurrence of the path errors and adjust parameters related to axis movements at the parts concerned. In particular, if the path errors are displayed for only those parts in which the preset predetermined threshold value is exceeded by the path errors, the worker can more easily ascertain those machining parts which require adjustment of axis parameters. Moreover, if the path errors are displayed divided between the X-Y-Z components or between the components in the relative movement directions of the tool and the workpiece, components perpendicular to the machined surface, components perpendicular to both the machined surface and the relative movement directions of the tool and the workpiece, and the like, the worker can ascertain the axis whose parameters should be adjusted in each machining position by only glancing at the display concerned.

Figure 7:
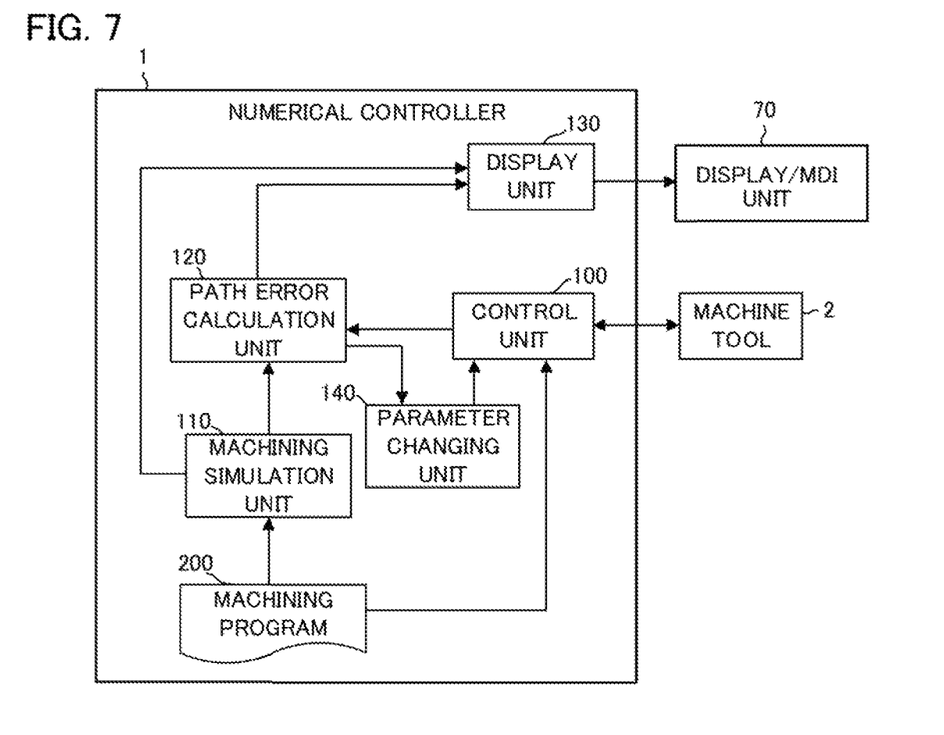
FIG. 7 is a schematic functional block diagram of a numerical controller according to a third embodiment.

FIG. 7 is a schematic functional block diagram of a numerical controller 1 according to a third embodiment of the present invention. Each functional block shown in FIG. 7 is implemented as the CPU 11 of the numerical controller 1 shown in FIG. 1 executes the system program and controls the operation of each part of the numerical controller 1.

The numerical controller 1 of the present embodiment comprises a control unit 100, machining simulation unit 110, path error calculation unit 120, display unit 130, and parameter changing unit 140, and a machining program 200 as an object of machining simulation is previously stored on the non-volatile memory 14.

The control unit 100, machining simulation unit 110, and display unit 130 according to the present embodiment have the same functions as the control unit 100, machining simulation unit 110, and display unit 130 of the second embodiment.

Moreover, the path error calculation unit 120 according to the present embodiment has the same function as that of the second embodiment, and furthermore, outputs the calculated path errors to the parameter changing unit 140.

The parameter changing unit 140 is a functional means for analyzing the path errors between the feedback data of each motor and the relative movement paths for the tool and the workpiece during machining, as the result of machining simulation and commanding the control unit 100 to change the parameters of a predetermined axis in each position. The parameter changing unit 140 commands the control unit 100 to reduce the influences of the vibration components of those axes for which preset predetermined threshold values $th_{dx}$, $th_{dy}$, and $th_{dz}$ are exceeded by axial path errors $d_{ix}$, $d_{iy}$ and $d_{iz}$ obtained by dividing the path errors $d_i$ in the individual positions in the relative movement paths for the tool and the workpiece into coordinate-direction components, X-, Y-, and Z-axes, that is, to change parameters such as time constants in a direction to reduce the acceleration and jerk of the axes concerned, for example.

The parameter changing unit 140 may be configured to perform analysis based on the division of the path errors $d_i$ into the coordinate-direction components X-, Y-, and Z-axes, on the assumption that the components of the path errors $d_i$ in the relative movement directions of the tool and the workpiece in the individual machining positions are 0. This can be done because the path errors of the components in the relative movement directions of the tool and the workpiece in the machining positions have no substantial influences on the quality of the machined surface.

The numerical controller 1 of the present embodiment constructed in this manner can analyze the path errors between the relative movement paths for the tool and the workpiece commanded by the machining program 200 and the relative movement paths for the tool and the workpiece closely resembling the actual machining and somewhat automatically adjust the parameters of the axes at the machining portion where the path errors influence the quality of the machined surface. Thus, the worker's labor for the parameter adjustment can be reduced.

While embodiments of the present invention have been described herein, the invention is not limited to the examples of the above-described embodiments and may be suitably modified and embodied in various forms.

The invention claimed is:

1. A numerical controller configured to relatively control a tool of a machine tool and a workpiece based on a machining program, thereby machining the workpiece, the numerical controller comprising:
 a control unit configured to control the machine tool and acquire feedback data of relative positions of the tool and the workpiece;
 a machining simulation unit configured to perform simulation processing for the machining based on the machining program and create a shape of the machined workpiece; and
 a display unit configured to display the machined workpiece shape created by the machining simulation unit, wherein a result of machining simulation processing is displayed based on the feedback data acquired during idling for driving an axis of the machine tool with no workpiece set,
 wherein the machining simulation unit performs the machining simulation processing using the feedback data acquired by the control unit, in place of the relative movement paths for the tool and the workpiece based on a command by the machining program.

2. The numerical controller according to claim 1, further comprising a path error calculation unit configured to calculate path errors as differences between the relative movement paths for the tool and the workpiece based on the command by the machining program and the feedback data in the relative positions of the tool and the workpiece acquired by the control unit, wherein the display unit displays the machined workpiece shape created by the machining simulation unit together with information on the path errors calculated by the path error calculation unit.

3. The numerical controller according to claim 2, wherein the display unit displays only those path errors which exceed a preset predetermined threshold value.

4. The numerical controller according to claim 2, wherein the display unit displays the path errors divided into X-, Y-, and Z-axes.

5. The numerical controller according to claim 2, wherein the display unit displays the path errors divided into components in the movement direction of the tool, components perpendicular to a machined surface, and components perpendicular to the movement direction and the machined surface.

6. The numerical controller according to claim 2, further comprising a parameter changing unit configured to analyze the path errors calculated by the path error calculation unit and command the control unit to change parameters of an axis in a machining position exceeding a preset predetermined threshold value.

* * * * *